US012667036B2

(12) United States Patent
Fay, II et al.

(10) Patent No.: US 12,667,036 B2
(45) Date of Patent: Jun. 30, 2026

(54) BIASING MECHANISM FOR HEADER TILT ON A CENTER-PIVOT MOWER

(71) Applicant: CNH Industrial America LLC, New Holland, PA (US)

(72) Inventors: Jeffrey Fay, II, Oxford, PA (US); Glenn Bird, Leola, PA (US); Jason Shonk, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 474 days.

(21) Appl. No.: 18/205,336

(22) Filed: Jun. 2, 2023

(65) Prior Publication Data

US 2024/0397867 A1 Dec. 5, 2024

(51) Int. Cl.
| | |
|---|---|
| *A01B 63/00* | (2006.01) |
| *A01B 63/22* | (2006.01) |
| *A01B 73/00* | (2006.01) |
| *A01D 41/14* | (2006.01) |
| *A01B 63/108* | (2006.01) |

(52) U.S. Cl.
CPC ............ *A01B 63/008* (2013.01); *A01B 63/22* (2013.01); *A01B 73/005* (2013.01); *A01D 41/141* (2013.01); *A01D 41/145* (2013.01); *A01B 63/002* (2013.01); *A01B 63/108* (2013.01)

(58) Field of Classification Search
CPC ... A01B 63/008; A01B 63/002; A01B 63/108; A01B 63/22; A01B 73/005; A01D 41/141; A01D 41/145
See application file for complete search history.

(56) References Cited

U.S. PATENT DOCUMENTS

| | | | | |
|---|---|---|---|---|
| 4,179,870 | A | | 12/1979 | Rowse |
| 4,435,948 | A | * | 3/1984 | Jennings .............. A01B 73/005 |
| | | | | 56/192 |
| 4,442,662 | A | * | 4/1984 | Jennings .............. A01B 73/005 |
| | | | | 172/625 |
| 4,473,993 | A | * | 10/1984 | Jennings ................ A01D 34/28 |
| | | | | 56/192 |
| 4,573,308 | A | | 3/1986 | Ehrecke et al. |
| 4,776,153 | A | | 10/1988 | DePauw et al. |
| 4,815,262 | A | | 3/1989 | Koch et al. |
| 4,840,019 | A | | 6/1989 | Pingry |
| 4,947,629 | A | | 8/1990 | Ermacora et al. |

(Continued)

FOREIGN PATENT DOCUMENTS

| | | | | |
|---|---|---|---|---|
| EP | 1131992 A1 | * | 9/2001 | .......... A01D 34/661 |
| WO | 9528825 A1 | | 11/1995 | |

*Primary Examiner* — Arpad Fabian-Kovacs
(74) *Attorney, Agent, or Firm* — Buchanan Ingersoll & Rooney PC

(57) ABSTRACT

A pull-type mower having a frame and a header movably attached to the frame, the header including; a cutting mechanism; a conditioning mechanism; a lift mechanism comprising one or more hydraulic actuators, the lift mechanism configured to lift the frame relative to a ground surface below the mower; a tilt mechanism comprising one or more hydraulic actuators, the tilt mechanism configured to rotate the header about an axis transverse to a fore-aft axis of the header; and a spring mechanism arranged in parallel to the one or more tilt hydraulic actuators, the spring mechanism configured to apply a biasing force that tilts the header forward when the one or more tilt hydraulic cylinders are depressurized.

13 Claims, 8 Drawing Sheets

(56)                    References Cited

U.S. PATENT DOCUMENTS

| | | | |
|---|---|---|---|
| 4,955,187 A | 9/1990 | van der Lely | |
| 5,704,200 A * | 1/1998 | Chmielewski, Jr. | .......................... A01D 41/141 56/DIG. 15 |
| 5,778,647 A | 7/1998 | McLean et al. | |
| 5,867,970 A | 2/1999 | Ehrhart et al. | |
| 5,943,848 A | 8/1999 | Rice et al. | |
| 5,970,689 A | 10/1999 | Hoffman et al. | |
| 6,684,614 B2 | 2/2004 | Greenwell | |
| 7,661,251 B1 * | 2/2010 | Sloan | ................... A01D 41/145 60/413 |
| 7,987,656 B2 * | 8/2011 | Ehrhart | ................. A01D 75/28 56/208 |
| 8,025,312 B1 * | 9/2011 | Honas | ................. A01D 75/002 56/228 |
| 8,745,964 B2 | 6/2014 | Patterson et al. | |
| 8,863,484 B2 | 10/2014 | Patterson et al. | |
| 10,159,182 B2 | 12/2018 | Berggren | |
| 10,216,156 B2 * | 2/2019 | Enns | ...................... G05B 15/02 |
| 10,631,452 B2 * | 4/2020 | Fay, II | ................... A01B 63/22 |
| 11,497,164 B2 * | 11/2022 | Martin | ................. A01B 63/002 |
| 2008/0271426 A1 * | 11/2008 | Lohrentz | ............... A01D 57/20 56/153 |
| 2011/0047946 A1 * | 3/2011 | Otto | ..................... A01D 41/145 56/10.2 E |
| 2011/0197561 A1 * | 8/2011 | Priepke | ............... A01D 75/004 56/228 |
| 2013/0284469 A1 * | 10/2013 | Barnett | .................. A01D 43/06 172/452 |
| 2018/0070531 A1 * | 3/2018 | Long | ................. A01D 34/006 |
| 2019/0230857 A1 * | 8/2019 | Thomson | ............ A01D 41/141 |
| 2020/0214200 A1 * | 7/2020 | Karst | .................. A01D 34/006 |
| 2020/0337240 A1 * | 10/2020 | Brimeyer | ............ A01B 63/008 |
| 2020/0352093 A1 | 11/2020 | Fay, II | |
| 2020/0352096 A1 | 11/2020 | Fay, II et al. | |
| 2020/0352102 A1 | 11/2020 | Fay, II | |

* cited by examiner

BIASING MECHANISM FOR HEADER TILT ON A CENTER-PIVOT MOWER

BACKGROUND OF THE INVENTION

This invention relates generally to a machine for severing standing crops from the ground to initiate a harvesting process and, more particularly, to a mower conditioner incorporating a rotary disc cutterbar having a number of rotatable discs supported thereon and carrying knives to sever standing crop by an impact action and convey the severed crop to a conditioning mechanism before being discharged to the ground.

Disc cutterbars have been utilized in agricultural harvesting implements for many years. Each disc cutterbar includes a plurality of transversely spaced disc cutters driven for rotation about a generally vertical axis. Each disc cutter has two or three knives pivotally mounted on the periphery thereof to sever standing crop from the ground through an impact action. For background information on the structure and operation of disc cutterbars, reference is made to U.S. Pat. No. 4,815,262 and EP 0769895, the entire disclosures of which are incorporated herein by reference for all purposes.

The construction of disc cutterbars has evolved over the years to the configuration of having a modular construction with cutter modules and spacer modules, such as shown in U.S. Pat. No. 4,840,019, the entire disclosure of which is incorporated herein by reference for all purposes. In some instances, the cutter modules and the spacer modules were integrally formed into one unit such as shown and described in U.S. Pat. No. 4,947,629, the entire disclosure of which is incorporated herein by reference for all purposes.

It has been found that the specific use of the disc cutterbar apparatus, e.g. whether used as part of a disc mower, such as shown and depicted in U.S. Pat. No. 4,955,187 (the entire disclosure of which is incorporated herein by reference), which is typically supported at one end, or as part of a disc mower-conditioner which usually provides support to the cutterbar at both opposing ends thereof, carries with that particular use a different set of design parameters than other machines in which the cutterbar is utilized.

The weight of the completed disc mower assembly on a disc mower-conditioner needs to be as light as possible to minimize the required size of the cutterbar flotation springs and to reduce the inertia forces imposed on the cutterbar components when the cutterbar strikes and slides over an obstacle at high ground speeds. The weight of the cutterbar when utilized in a disc mower configuration also needs to be as light as possible to minimize the force and friction from the ground to minimize the wear of the ground contacting skid shoes, and also to minimize the damage to the crop which comes in contact with the skid shoes. A further consideration in keeping the weight of the cutterbar as light as possible is to reduce the loads imposed on the frame components when the disc mower is placed into a transport position in which the total weight of the cutterbar is supported by the frame. A corollary consideration is the desire to keep these frame components as light as possible.

Trailed disc mower conditioners, also known as center-pivot disc mower-conditioners, may be provided with lift systems having one or more hydraulic cylinders to raise the mower relative to the ground to clear cut crop or obstacles during field operation or for storage or transport on the highway. A trailed disc mower conditioner may also be provided with a hydraulically-actuated tilt mechanism to adjust the fore-aft pitch of the mower, which can be pivoted on the lift mechanism to angle the cutterbar up and away from or down and toward the ground, depending on crop and/or ground conditions and/or for a specific type of cut. A typical hydraulic system uses single-acting lift cylinders plumbed in parallel with a single-acting tilt cylinder, with hydraulic pressure from the tractor used to extend the lift cylinders and retract the tilt cylinder. The system relies on gravity to lower the mower to the ground (retract the lift cylinders) and tilt the header forward (extend the tilt cylinder) by opening the lift hydraulics to tank. The hydraulic circuit requires one hose going to the tractor, using only one remote.

A problem can occur with this system, when the geometry of the mower apparatus places the center of gravity of the mower too far back with respect to the tilt pivot, so that the mower no longer tilts forward automatically when the lift cylinders are retracted and the mower is lowered to the ground. In order to fully deploy the mower to an operating position, the operator must exit the vehicle and manually tilt the mower until its center of gravity passes the tipping point. Thus, the inventors have determined that the state of the art of header floatation system can still be improved.

This description of the background is provided to assist with an understanding of the following explanations of exemplary embodiments, and is not an admission that any or all of this background information is necessarily prior art.

SUMMARY OF THE INVENTION

In a first exemplary aspect, a pull-type mower is provided. The mower includes a frame and a header movably attached to the frame. The header includes a cutting mechanism, a conditioning mechanism, a lift mechanism, and a tilt mechanism. The lift mechanism includes one or more hydraulic actuators and is configured to lift the frame relative to a ground surface below the mower. The tilt mechanism includes one or more hydraulic actuators and is configured to rotate the header about an axis transverse to a fore-aft axis of the header. A spring mechanism arranged in parallel to the one or more tilt hydraulic actuators is configured to apply a biasing force that tilts the header forward when the one or more tilt hydraulic cylinders are depressurized.

In some exemplary aspects, the cutting mechanism comprises a disc mower.

In some exemplary aspects, the conditioning mechanism comprises a roller or a flail.

In some exemplary aspects, the one or more lift actuators and the one or more tilt actuators each comprise a single-acting hydraulic cylinder, wherein one or more lift actuator cylinders extend when pressurized to apply a lifting force to the frame, and wherein the one or more tilt actuator cylinders retract when pressurized to apply a force that tilts the header rearward.

In some exemplary aspects, the one or more lift actuators and the one or more tilt actuators are connected in parallel to a single hydraulic line.

In some exemplary aspects, the spring mechanism comprises a compression spring.

In some exemplary aspects, the spring mechanism comprises a tension spring and a compound linkage.

In some exemplary aspects, an agricultural harvesting machine comprises a mower according to the first exemplary aspect.

In a second exemplary aspect, a pull-type mower is provided, comprising: frame; a header movably attached to the frame, the header comprising a cutting mechanism and a conditioning mechanism; a lift mechanism comprising one or more hydraulic actuators, the lift mechanism configured to lift the frame relative to a ground surface below the mower; and a tilt mechanism comprising one or more hydraulic actuators, the tilt mechanism configured to rotate the header about an axis transverse to a fore-aft axis of the header; wherein the one or more lift actuators each comprise a single-acting hydraulic cylinder, wherein one or more lift actuator cylinders extend when pressurized to apply a lifting force to the frame; and wherein the one or more tilt hydraulic actuators each comprise a double-acting hydraulic cylinder and are configured to extend when a barrel end of the tilt actuator is pressurized to apply a biasing force that tilts the header forward.

In some exemplary aspects, in the mower of the second exemplary aspect, the cutting mechanism comprises a disc mower.

In some exemplary aspects, in the mower of the second exemplary aspect, the conditioning mechanism comprises a roller or a flail.

In some exemplary aspects, in the mower of the second exemplary aspect, a barrel end of the one or more lift actuators and a rod end of the one or more tilt actuators are operatively connected in parallel to a first hydraulic line, and wherein the barrel end of the one or more tilt actuators is operatively connected to a second hydraulic line.

In some exemplary aspects, an agricultural harvesting machine comprises the mower of the second exemplary aspect.

BRIEF DESCRIPTION OF THE DRAWING
FIGURES

Embodiments of inventions will now be described, strictly by way of example, with reference to the accompanying drawings, in which.

DETAILED DESCRIPTION OF THE
INVENTION

Embodiments described herein provide a method of operating a header float system of an agricultural vehicle having a header movably mounted to a chassis by an actuator system to maintain a constant, predetermined ground reaction force between a header component and the underlying ground during operation of the header. Embodiments are shown in use with windrower headers, but other embodiments may be used with other mechanisms that contact the ground.

The terms "crop" and "crop material" are used to describe any mixture of grain, seeds, straw, tailings, and the like. "Grain" or "seeds" refer to that part of the crop material which is threshed and separated from the discardable part of the crop material (e.g., straw and tailings), and includes grain in aggregate form such as an ear of corn. The portion of the crop material that generally is discarded or not used for food or growing purposes may be referred to as non-grain crop material, material other than grain (MOG) or straw.

Also, the terms "forward," "rearward," "left," and "right", when used in connection with the agricultural harvester (e.g. mower) and/or components thereof are usually determined with reference to the direction of forward operative travel of the mower, but again, they should not be construed as limiting. The terms "longitudinal" and "transverse" are determined with reference to the fore-and-aft direction of the agricultural mower and are equally not to be construed as limiting.

Figure 1:
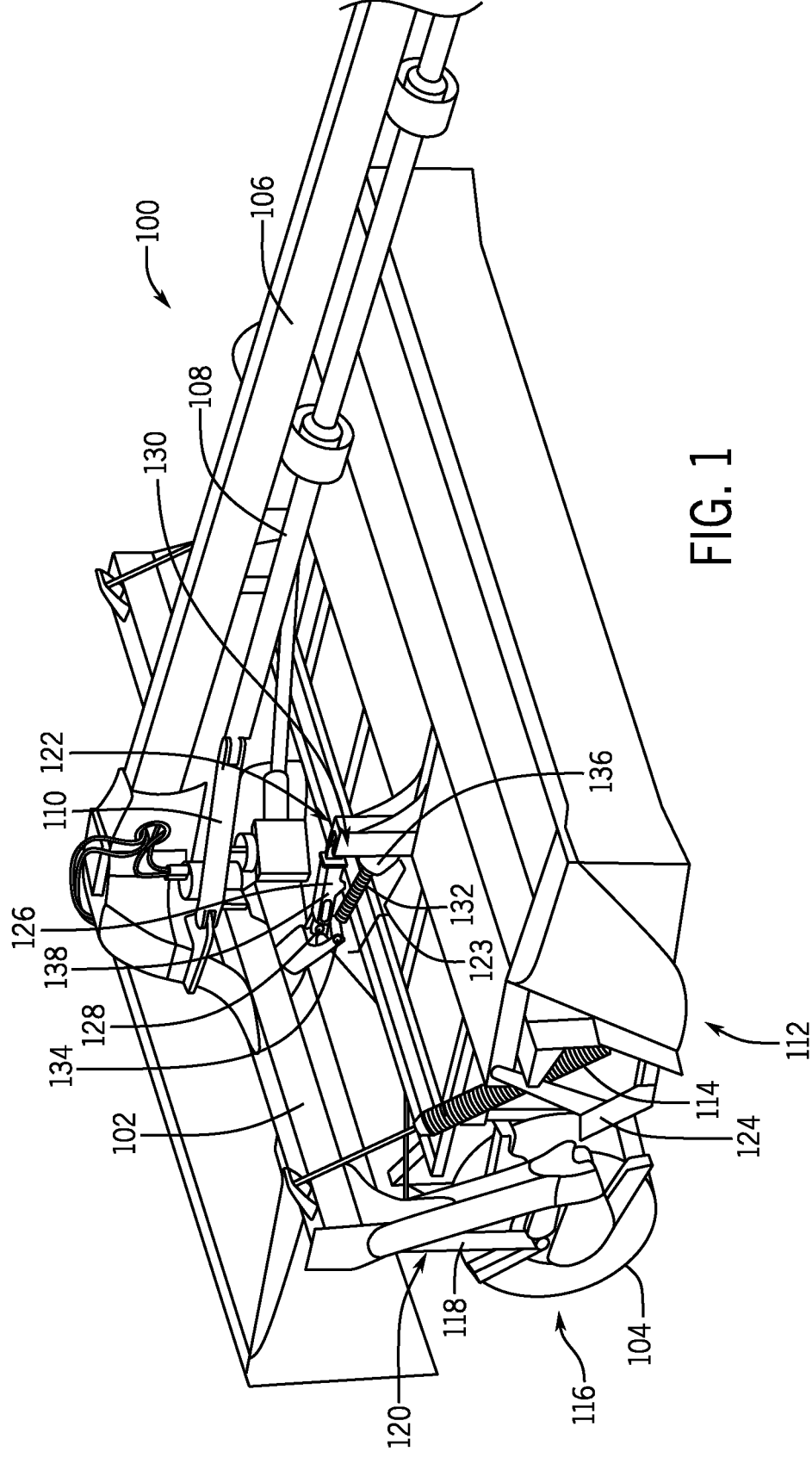
FIG. 1 is an isometric view of a mower according to a first aspect of the invention, shown in a fully raised and back-tilted position.

Referring now to the drawings and, particularly, to FIG. 1, a disc mower conditioner utilizing a disc cutterbar and incorporating the principles of the first exemplary aspect of the instant invention can best be seen. Left and right references are used as a matter of convenience and are determined by standing at the rear of the machine facing forwardly into the normal direction of travel.

The disc mower conditioner 100 is provided with a generally conventional frame 102 supported over the ground by a pair of transversely spaced wheels 104 and a draft tongue 106 attached to the tractor (not shown), as is known in the art. Rotational power is delivered from the tractor (not shown) to the disc mower conditioner 100 by a power-take-off (PTO) shaft 108 rotatably coupled with the tractor in a conventional manner. As is known in the art, the draft tongue 106 is pivotally connected to the implement frame 102, the pivotal movement thereof being controlled by a hydraulic cylinder 110 interconnecting the tongue 106 and the frame 102. Through manipulation of the hydraulic cylinder 110, the disc mower conditioner 100 can be moved between a transport position behind the tractor and an operative position outboard to the right or left of the tractor so that the disc mower conditioner 100 can be operated without the tractor (not shown) running over the standing crop.

The frame 102 supports a header 112 suspended therefrom by a flotation mechanism 114 so that the header 112 can move vertically relative to the frame 102 to enable the header 112 to follow ground undulations and to allow the header 112 to be raised into an elevated transport position. The header 112 supports a cutting mechanism (not shown), preferably in the form of a disc mower as are known in the art, and a conditioning mechanism (also not shown), preferably in the form of a pair of intermeshing conditioning rolls or a flail, which receive severed crop and condition the severed crop material. Together the header 112 forms what is known as a disc mower-conditioner, and with the frame 102, tongue 106, and associated components, forms what is known as a center-pivot disc mower-conditioner (CPDMC). The conditioning mechanism discharges the crop material rearwardly, optionally into a plurality laterally spaced windrow shields (not shown) that consolidate the severed and conditioned crop into a windrow formed behind the implement 100.

Header 112 further includes a lift mechanism 116 comprising a pair of hydraulic lift actuators 118, each operatively connected to one of the transversely spaced wheels 104 and configured to lift the frame 102 relative to a ground surface below the header 112 by extending when the barrel end 120 of the lift actuators 118 is pressurized. A tilt mechanism 122 is configured to rotate the header 112 about an axis formed by pivots 124 transversely spaced on frame 102. Tilt mechanism 122 includes a hydraulic tilt actuator 126 operatively connected to the frame 102 at pivot 128 and to the header at connection point 130. A compression spring 132 operatively connected to the frame 102 at pivot 134 and to the header 112 at pivot 136 is arranged in parallel to tilt actuators 126 and is configured to extend tilt actuator 126 with a biasing force that tilts the header 112 forward when the rod end 138 of the tilt actuator 126 is depressurized.

In the embodiment shown in FIG. 1, the lift actuators 118 and the tilt actuator 126 each comprise a single-acting hydraulic cylinder, wherein lift actuator 118 cylinders extend when pressurized to apply a lifting force to the frame 102, and wherein the tilt actuator 126 cylinder retracts when pressurized to apply a force that tilts the header 112 rearward, lifting the cutting mechanism away from the ground below. Preferably, the barrel ends 120 lift actuators 118 and the rod end 138 of the tilt actuator 126 are connected in parallel to a common hydraulic line (not shown).

Also, in the embodiment shown in FIG. 1, the spring mechanism 123 comprises a compression spring 132. However, an equivalent arrangement, for example, a tension spring operatively connected to a compound linkage, may be used to apply the biasing force that tilts the header 112 forward when the rod end 138 of the tilt actuator 126 is depressurized.

Figure 2:
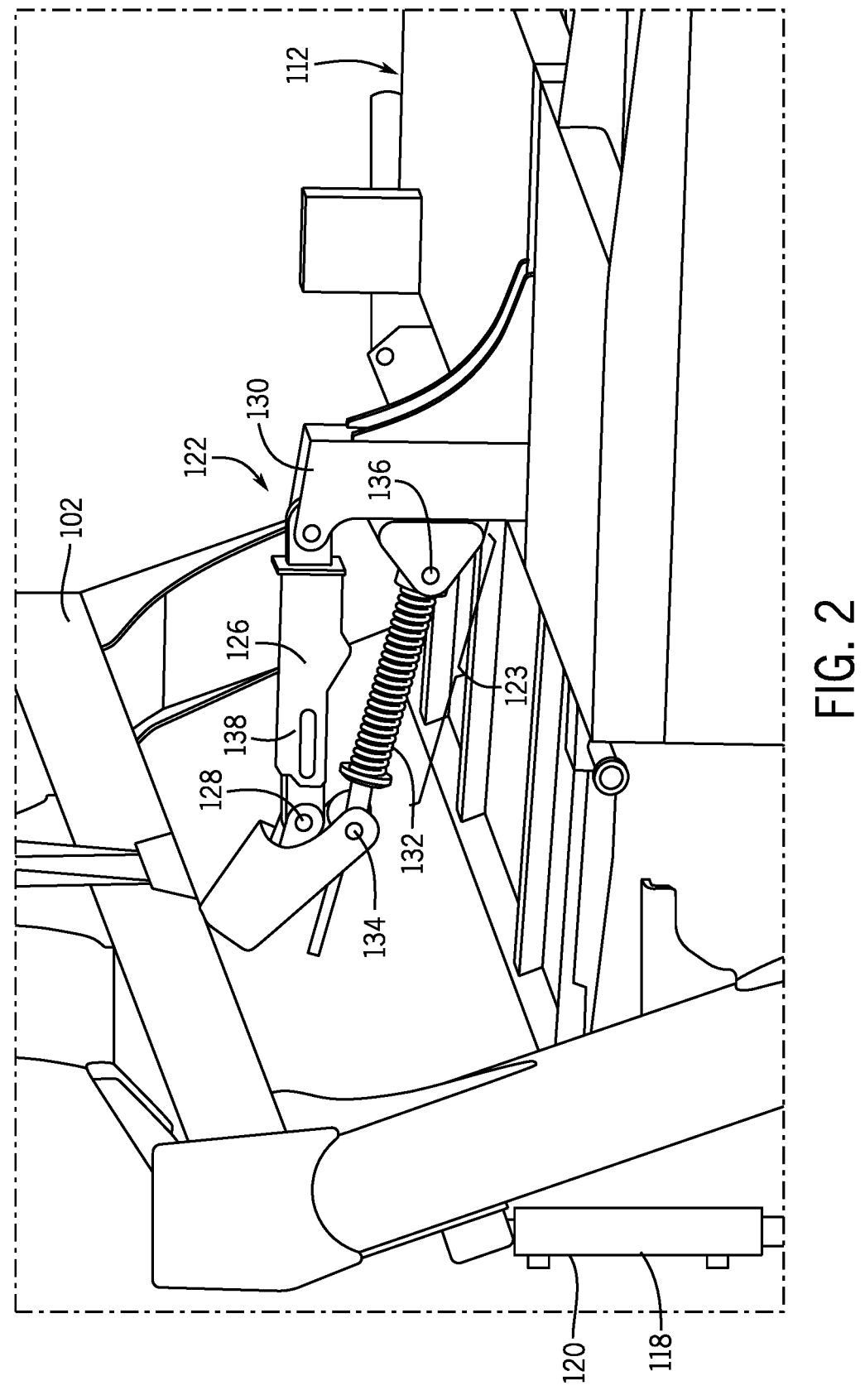
FIG. 2 is an isometric detail of a spring mechanism according to some exemplary aspects of the invention, wherein the tilt actuator is fully retracted and the spring compressed.
Figure 3:
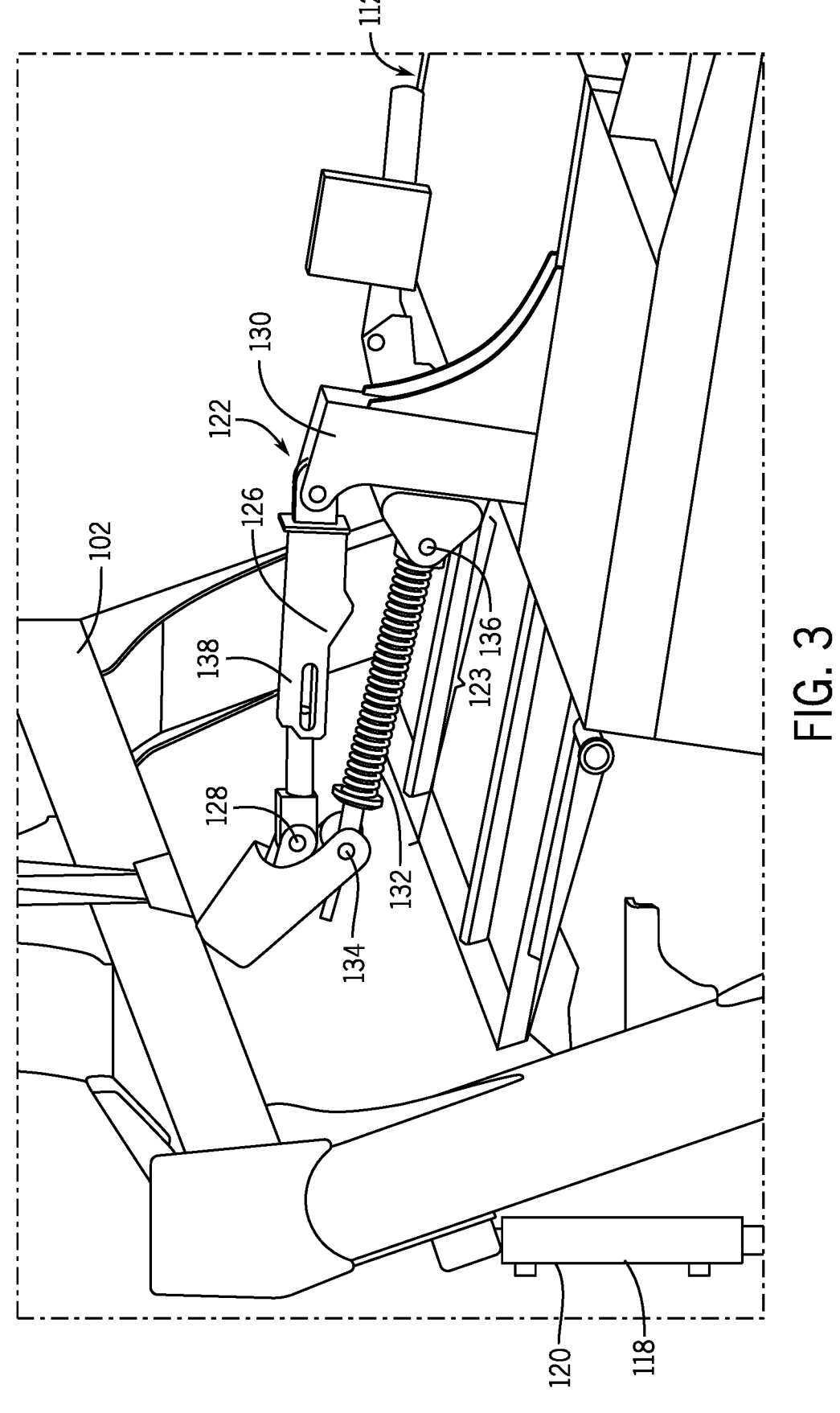
FIG. 3 is an isometric detail of a spring mechanism according to some exemplary aspects of the invention, wherein the tilt actuator is fully extended and the spring is decompressed.

Referring now to FIGS. 2 and 3, spring mechanism 123 is seen in greater detail. In FIG. 2, header 112 is shown in tilted back position, in which rod end 138 of tilt actuator 126 is pressurized, tilt actuator 126 is retracted, and spring 132 is compressed. At the same time, barrel ends 120 of lift actuators 118 are pressurized, extending lift actuators 118 and lifting frame 102 and header 112 up and away from the ground beneath header 112. In FIG. 3, header 112 is shown in the opposite position, in which header 112 is tilted forward position, rod end 138 of tilt actuator 126 is depressurized, and tilt actuator 126 is extended by the biasing force supplied by the extension of compression spring 132. At the same time, barrel ends 120 of lift actuators 118 are depressurized, retracting lift actuators 118 and lowering frame 102 and header 112 down towards the ground beneath header 112.

Figure 4:
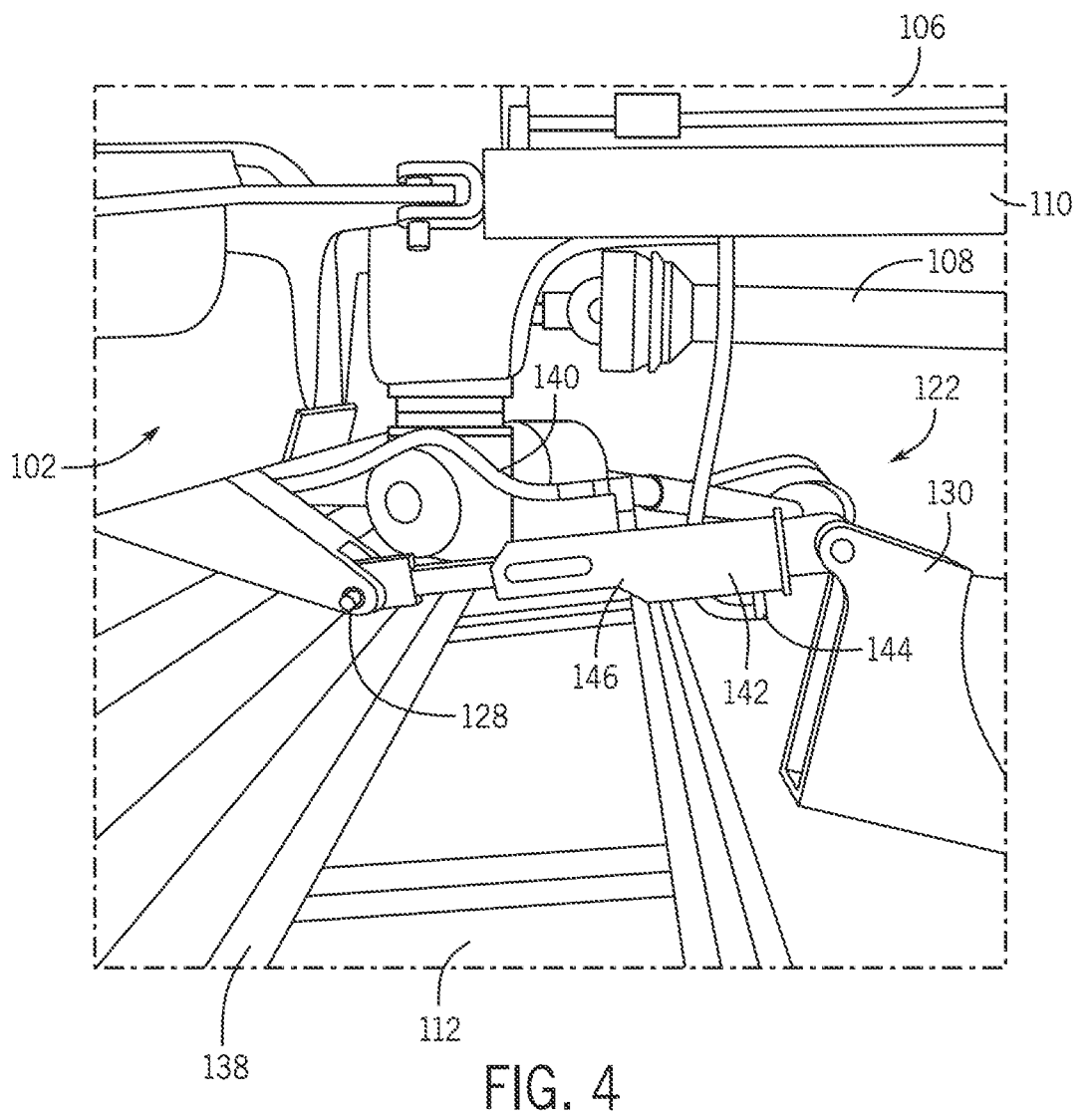
FIG. 4 is an isometric detail of a tilt mechanism according to the second exemplary aspect of the invention, wherein the tilt actuator is fully extended.
Figure 5:
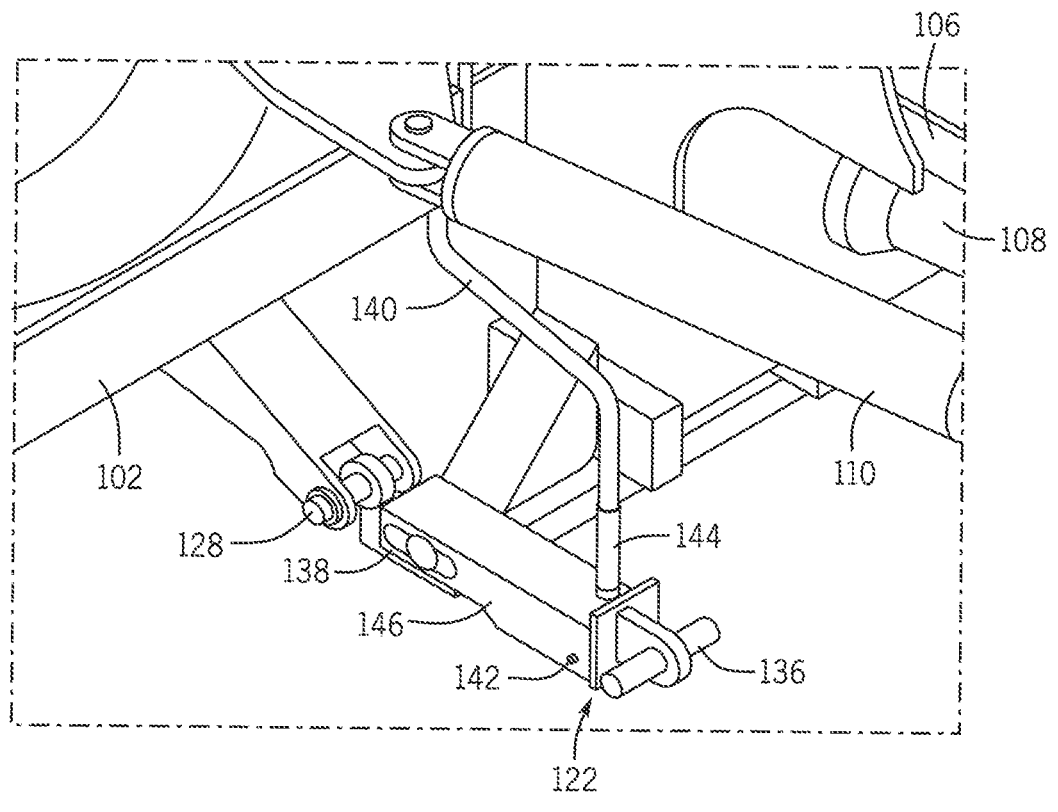
FIG. 5 is an isometric detail of a tilt mechanism according to the second exemplary aspect of the invention, wherein the tilt actuator is fully retracted.

Referring now to FIGS. 4 and 5, an embodiment in accordance with a second exemplary aspect of the invention is shown. Instead of spring mechanism 123, tilt actuator 126 is now a double acting hydraulic cylinder 146, wherein the rod end 138 is connected to a first hydraulic line 140, and the barrel end 142 is connected to a second hydraulic line 144. Double-acting tilt actuator 146 is configured to extend when the barrel end 142 of the tilt actuator 146 is pressurized to apply a biasing force that tilts the header 112 forward, while lift actuators 118 each comprise a single-acting hydraulic cylinder, as in the first exemplary aspect illustrated in FIGS. 1-3. The barrel ends 120 of lift actuators 118 and the rod end 138 of the tilt actuator 146 are operatively connected in parallel to the first hydraulic line 140, and and the barrel end 142 of the tilt actuator 146 is operatively connected to the second hydraulic line 144.

Figure 6:
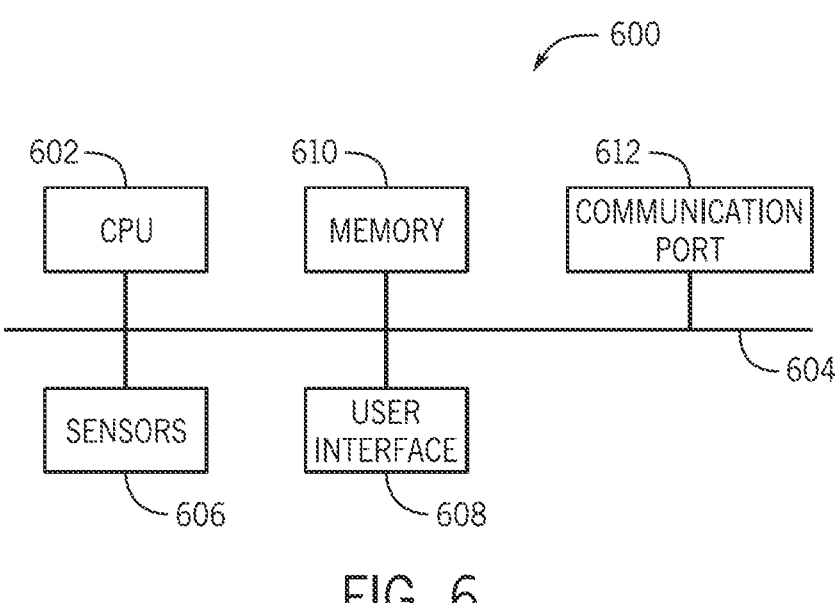
FIG. 6 is a schematic illustration of an exemplary header control system.

FIG. 6 is a block diagram of exemplary hardware and computing equipment that may be used as a control system 600 to control the lift and tilt mechanisms 116, 122 of mower 100. The control system 600 includes a central processing unit (CPU) 602, which is responsible for performing calculations and logic operations required to execute one or more computer programs or operations. The CPU 602 is connected via a data transmission bus 604, to sensors 606 (e.g., position sensors on actuators 118, 126, or 146, mounting point 130, or pivots 124, 128, 130, or other header 112 suspension components), a user interface 608, and a memory 610. The user interface 608 may comprise any suitable device for providing user input to or output from the control system 600, such as toggle switches, dials, digital switches, touchscreen displays, and the like. The control system 600 also has a communication port 612 that may be operatively connected (wired or wirelessly) to the header's electrical terminal (not shown). One or more analog to digital conversion circuits may be provided to convert analog data from the sensors 606 to an appropriate digital signal for processing by the CPU 602, and signal conditioning circuits may be used to filter or perform other functions on the raw data, as known in the art.

The CPU 602, data transmission bus 604 and memory 610 may comprise any suitable computing device, such as an INTEL ATOM E3826 1.46 GHZ Dual Core CPU or the like, being coupled to DDR3L 1066/1333 MHZ SO-DIMM Socket SDRAM having a 4 GB memory capacity or other non-transitory memory (e.g., compact disk, digital disk, solid state drive, flash memory, memory card, USB drive, optical disc storage, etc.). The CPU 602 also may comprise a circuit on a chip, microprocessor, or other suitable computing device. The selection of an appropriate processing system and memory is a matter of routine practice and need not be discussed in greater detail herein. The control system 600 may be integrated into an existing vehicle control system, added as a new component, or be a self-contained system.

It is to be understood that operational steps performed by the control system 600 may be performed by the controller upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller described herein is implemented in software code or instructions which are tangibly stored on a tangible computer readable medium. Upon loading and executing such software code or instructions by the controller, the controller may perform any of the functionality of the controller described herein, including any steps of the methods described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

Figure 7:
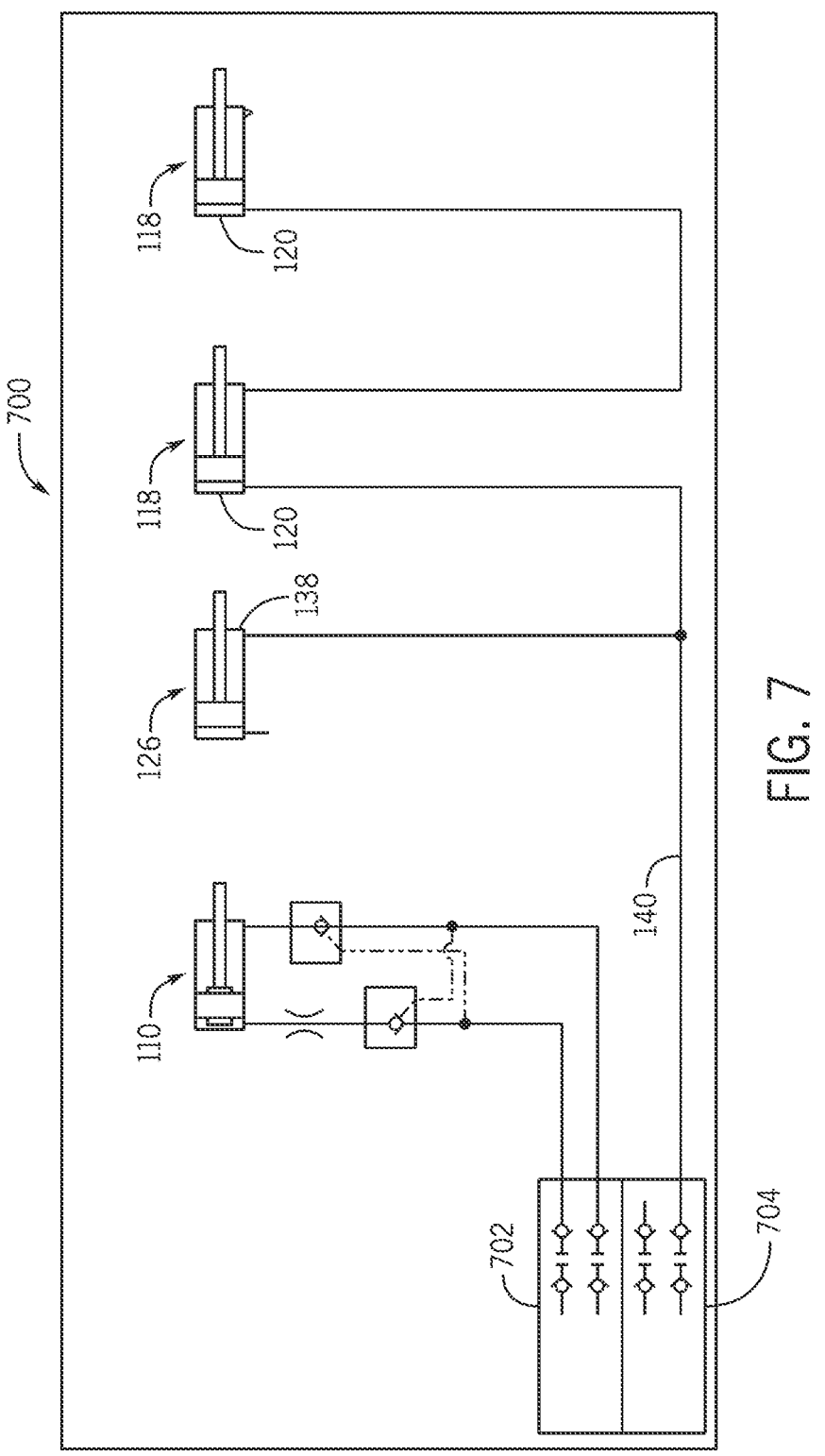
FIG. 7 is a schematic illustration of a hydraulic system for controlling a header.
Figure 8:
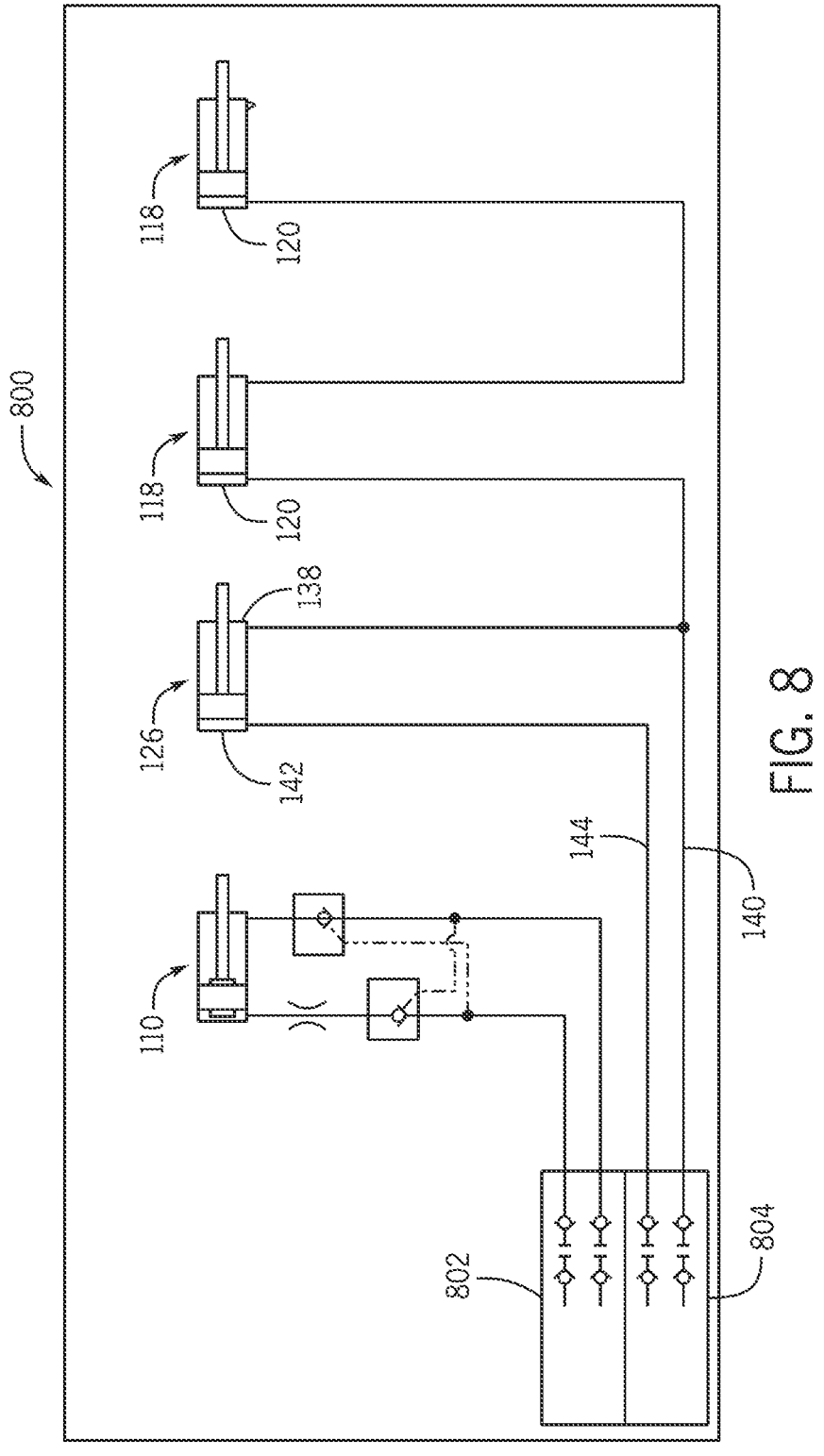
FIG. 8 is a schematic illustration of a hydraulic system for controlling a header, shown in a different configuration.

FIGS. 7 and 8 are simplified schematics of hydraulic systems that may be used to control the lift and tilt mechanisms 116, 122 of mower 100. FIG. 7 illustrates an example of a hydraulic system 700 that may be used to control the header 112 in the first exemplary aspect of the invention as described and illustrated above in connection with FIGS. 1-3. The hydraulic system 700 generally includes a swing cylinder 110 that is operated by a first remote 702. A second remote 704 operates lift cylinders 118 and tilt cylinder 126. To lift header 112 up and tilt header 112 back, pressurized hydraulic fluid is supplied by, e.g., a reservoir (not shown) and hydraulic pump (not shown) via hydraulic line 140 to the rod end 138 of tilt cylinder 126 and to the barrel ends 120 of lift cylinders 118. To lower header 112 and tilt header 112 forward, rod end 138 of tilt cylinder 126 and barrel ends 120 of lift cylinders 118 are depressurized (i.e., opened to reservoir).

FIG. 8 illustrates an example of a hydraulic system 800 that may be used to control the header 112 in the second exemplary aspect of the invention as described and illustrated above in connection with FIGS. 4 and 5. The hydraulic system 800 generally includes a swing cylinder 110 that is operated by a first remote 802. A second remote 804 operates lift cylinders 118 and tilt cylinder 146. To lift header 112 up and tilt header 112 back, pressurized hydraulic fluid is supplied by, e.g., a reservoir (not shown) and hydraulic pump (not shown) via hydraulic line 140 to the rod end 138 of tilt cylinder 146 and to the barrel ends 120 of lift cylinders 118. To lower header 112, barrel ends 120 of lift cylinders 118 are depressurized (i.e., opened to reservoir). To tilt header 112 back, pressurized hydraulic fluid is supplied by, e.g., a reservoir (not shown) and hydraulic pump (not shown) via second hydraulic line 144 to the barrel end 142 of tilt cylinder 146. With the additional hydraulic line 144, only 2 tractor remotes are needed to independently activate the tilt cylinder 146. Due to the difference in required pressure of the tilt cylinder 146 and the lift cylinders 118, lift only occurs after header 112 is tilted completely up, allowing for control of the cutting angle of header 112 without the need for a third tractor remote.

The exemplary hydraulic circuits 700, 800 may be modified in various ways. Other alternatives and variations will be apparent to persons of ordinary skill in the art in view of the present disclosure.

The present disclosure describes a number of inventive features and/or combinations of features that may be used alone or in combination with each other or in combination with other technologies. Although the invention is illustrated and described herein with reference to specific embodiments, the invention is not intended to be limited to the details shown. The embodiments described herein are all exemplary and are not intended to limit the scope of the claims. Rather, various modifications may be made in the details within the scope and range of equivalents of the claims and without departing from the invention. It will also be appreciated that the inventions described herein can be modified and adapted in various ways, and all such modifications and adaptations are intended to be included in the scope of this disclosure and the appended claims.

What is claimed:

1. A pull-type mower comprising:
   a frame;
   a header movably attached to the frame, the header comprising a cutting mechanism and a conditioning mechanism;
   a lift mechanism comprising one or more lift hydraulic actuators, the lift mechanism configured to lift the frame relative to a ground surface below the pull-type mower;

a tilt mechanism comprising one or more tilt hydraulic actuators, the tilt mechanism configured to rotate the header about an axis transverse to a fore-aft axis of the header; and
   a spring mechanism arranged in parallel to the one or more tilt hydraulic actuators, the spring mechanism configured to apply a biasing force that tilts the header forward when the one or more tilt hydraulic actuators are depressurized.

2. The pull-type mower of claim 1, wherein the cutting mechanism comprises a disc mower.

3. The pull-type mower of claim 1, wherein the conditioning mechanism comprises a roller or a flail.

4. The pull-type mower of claim 1, wherein the one or more lift hydraulic actuators and the one or more tilt hydraulic actuators each comprise a single-acting hydraulic cylinder, wherein the one or more lift hydraulic actuators extend when pressurized to apply a lifting force to the frame, and wherein the one or more tilt hydraulic actuators retract when pressurized to apply a force that tilts the header rearward.

5. The pull-type mower of claim 4, wherein the one or more lift hydraulic actuators and the one or more tilt hydraulic actuators are connected in parallel to a single hydraulic line.

6. The pull-type mower of claim 1, wherein the spring mechanism comprises a compression spring.

7. The pull-type mower of claim 1, wherein the spring mechanism comprises a tension spring and a compound linkage.

8. An agricultural harvesting machine, comprising the pull-type mower of claim 1.

9. A pull-type mower comprising:
   a frame;
   a header movably attached to the frame, the header comprising a cutting mechanism and a conditioning mechanism;
   a lift mechanism comprising one or more lift hydraulic actuators, the lift mechanism configured to lift the frame relative to a ground surface below the pull-type mower; and
   a tilt mechanism comprising one or more tilt hydraulic actuators, the tilt mechanism configured to rotate the header about an axis transverse to a fore-aft axis of the header;
   wherein the one or more lift hydraulic actuators each comprise a single-acting hydraulic cylinder, wherein the one or more lift hydraulic actuators extend when pressurized to apply a lifting force to the frame; and
   wherein the one or more tilt hydraulic actuators each comprise a double-acting hydraulic cylinder and are configured to extend when a barrel end of the one or more tilt hydraulic actuators is pressurized to apply a biasing force that tilts the header forward.

10. The pull-type mower of claim 9, wherein the cutting mechanism comprises a disc mower.

11. The pull-type mower of claim 9, wherein the conditioning mechanism comprises a roller or a flail.

12. The pull-type mower of claim 9, wherein a barrel end of the one or more lift hydraulic actuators and a rod end of the one or more tilt hydraulic actuators are operatively connected in parallel to a first hydraulic line, and wherein the barrel end of the one or more tilt hydraulic actuators is operatively connected to a second hydraulic line.

13. An agricultural harvesting machine, comprising the pull-type mower of claim 9.

* * * * *